United States Patent
Tornatore et al.

(10) Patent No.: US 6,857,513 B2
(45) Date of Patent: Feb. 22, 2005

(54) DUAL CLUTCH TRANSMISSION UNIT FOR A MOTOR VEHICLE

(75) Inventors: Giovanni Tornatore, S. Benigno Canavese (IT); Cesare Sola, Valperga (IT); Fabrizio Girola, Chatou (FR)

(73) Assignee: Magneti Marelli Powertrain S.p.A. (IT)

( * ) Notice: Subject to any disclaimer, the term of this patent is extended or adjusted under 35 U.S.C. 154(b) by 0 days.

(21) Appl. No.: 10/454,819

(22) Filed: Jun. 5, 2003

(65) Prior Publication Data
US 2004/0045782 A1 Mar. 11, 2004

(30) Foreign Application Priority Data
Jun. 7, 2002 (IT) ..................................... TO2002A0480

(51) Int. Cl.[7] ............................................. F16D 21/02
(52) U.S. Cl. .............................. 192/48.91; 192/70.25; 192/89.22; 192/111 R
(58) Field of Search ........................... 192/48.8, 48.91, 192/70.25, 111 R, 89.22

(56) References Cited

U.S. PATENT DOCUMENTS 2,775,330 A    12/1956  Schjolin et al.
4,238,019 A  * 12/1980  Maucher et al. .......... 192/99 A
6,397,994 B1 *  6/2002  Bowen ....................... 192/48.9
6,457,572 B1 * 10/2002  Dau et al. ................ 192/48.91
6,622,840 B2 *  9/2003  Dau et al. ................ 192/48.91
6,668,994 B2 * 12/2003  Hirt .......................... 192/48.8

FOREIGN PATENT DOCUMENTS

DE    3327984    2/1985
DE   19939818    1/2001
DE   10155458    5/2002

OTHER PUBLICATIONS

EPO Search Report, Dated Oct. 15, 2003.

* cited by examiner

Primary Examiner—Saul Rodriguez
(74) Attorney, Agent, or Firm—Hall, Myers, Vande Sande & Pequignot (57) ABSTRACT

A dual clutch transmission unit for a motor vehicle is adapted to transmit the movement to an automatic gear change provided with two ranks of gears; the transmission unit has a rotary movement input member adapted to be driven in rotation by the engine of the motor vehicle and two output shafts which are adapted to be rigidly connected to respective input shafts of the gear change and bear respective clutch devices which are adapted to receive the movement from the rotary member and are each associated with a relative rank of gears of the gear change; one of the clutch devices is disengaged and the other is engaged in sequence by an actuator device provided with a single actuator and a movement sleeve coaxial with one another.

35 Claims, 4 Drawing Sheets

DUAL CLUTCH TRANSMISSION UNIT FOR A MOTOR VEHICLE

The present invention relates to a dual clutch transmission unit for the transmission of movement, in a motor vehicle, from the engine to an automatic gear change provided with two ranks of gears, in particular a rank of even gears and a rank of odd gears.

These automatic gear changes make it possible to cancel out the lack of traction on the wheels during gear changes, as a result of the fact that they are actuated by two clutches which are controlled such that they transmit the movement selectively, one for the even gears and the other for the odd gears.

BACKGROUND OF THE INVENTION

According to known solutions, the two clutches are of the oil-bath type and are fully independent from one another, i.e. they are actuated by dedicated and separate devices, each of which comprises a relative actuator, a relative control device driven for instance by fluid supply and electrovalves in the case in which the actuator is of the oil-hydraulic type, and a relative sensor for controlling the stroke of this actuator.

In the known solutions described above, moreover, when the vehicle is stationary with the engine off, the actuators do not exert any action on the relative clutches, as a result of which the engine of the motor vehicle is uncoupled from both gear changes and, therefore, from the wheels.

The known solutions described above are relatively complex, as they include a relatively large number of components needed to actuate and control the two clutches independently.

The number of components of the motor vehicle is also high because it is necessary to provide an additional parking device of automatic type, for instance of the ratchet gear type, which keeps the wheels braked under the control of complex control and command systems when the motor vehicle is on a sloping road with the engine off.

SUMMARY OF THE INVENTION

The object of the present invention is to provide a dual clutch transmission unit for a motor vehicle which makes it possible simply and economically to resolve the above-mentioned problems.

According to the present invention, a dual clutch transmission unit for a motor vehicle provided with an automatic gear change comprises a first and a second rank of gears, the transmission unit comprising a rotary movement input member adapted to be driven in rotation by an engine of the motor vehicle, a first and a second movement output shaft adapted to be rigidly connected with respective input shafts of the gear change and associated with the first and the second rank of gears respectively, a first and a second clutch device adapted to transmit the movement from the rotary member to the first output shaft and the second output shaft respectively, and actuator means for the engagement and disengagement of the first and second clutch devices, characterised in that the actuator means comprise a single actuator device for disengaging one and, subsequently, engaging the other clutch device.

BRIEF DESCRIPTION OF THE DRAWINGS

The invention will be described below with reference to the accompanying drawings, which show a non-limiting embodiment thereof, and in which.

DETAILED DESCRIPTION OF THE INVENTION

In the accompanying drawings, a dual clutch transmission unit for a motor vehicle 3 (shown diagrammatically in FIG.1) provided with an internal combustion engine 4 and a gear change 5 is shown by 1.

Figure 2:
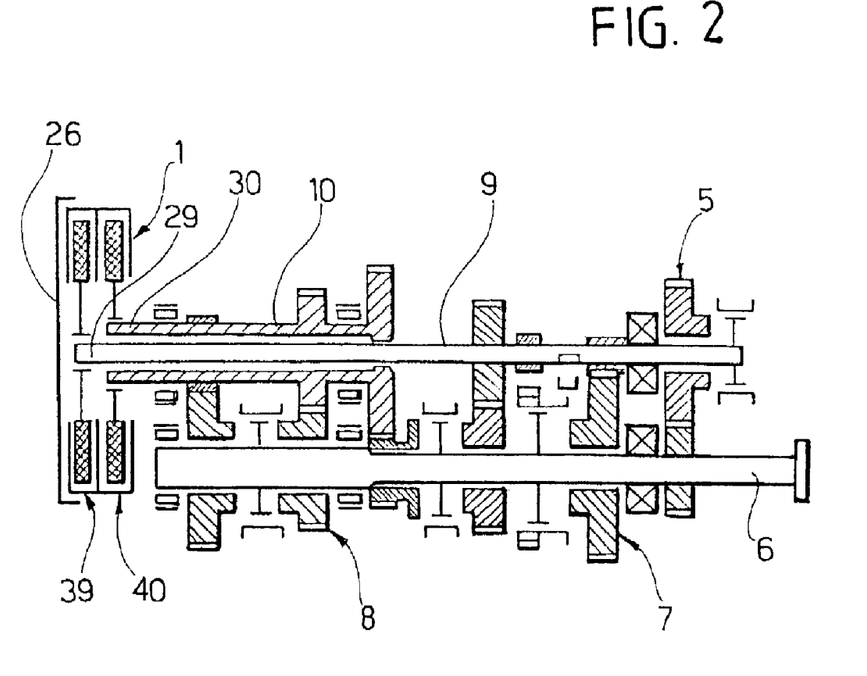
FIG. 2 is a diagrammatic cross-section showing the dual clutch transmission unit coupled to a gear change of the motor vehicle.

The gear change 5, of known type and shown diagrammatically, has a discrete number of gears each corresponding to a relative transmission ratio and comprises a movement output shaft 6 adapted to drive in rotation the drive wheels of the motor vehicle 3, and two movement input shafts 9, 10 (FIG. 2) which are coaxial and housed one within the other. The shafts 9, 10 are coupled to the shaft 6 by respective trains 7, 8 of toothed wheels associated with respective ranks of gears, for instance even gears and odd gears respectively.

Each rank of gears is controlled by a relative engagement actuator device 11, 12 (FIG. 1) in accordance with the setting imposed by the driver by means of a lever 13 disposed in the passenger space of the motor vehicle 3.

Figure 1:
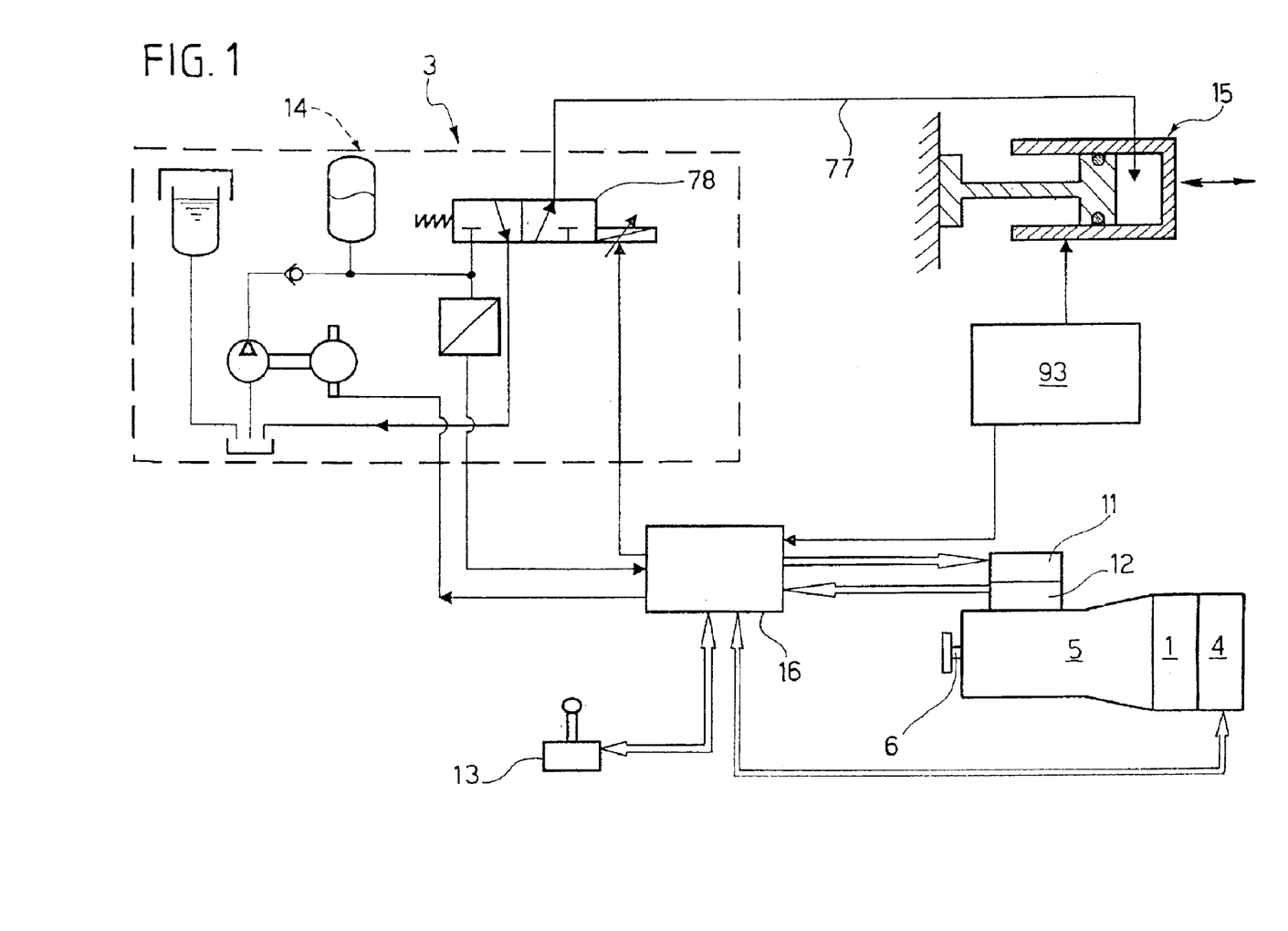
FIG. 1 is a block diagram showing a motor vehicle provided with a preferred embodiment of a dual clutch transmission unit of the present invention.

In FIG. 1, the motor vehicle 3 further comprises a plant 14 adapted to move an actuator device 15 forming of the unit 1, and an electronic command and control unit 16 which receives signals indicative of the functioning of the engine 4, the gear change 5 and the unit 1 and the setting of the lever 13, processes the data correlated with these signals and then controls the devices 11, 12, 15 to change the gears of the gear change 5 and to actuate the two clutches of the unit 1.

Figure 3:
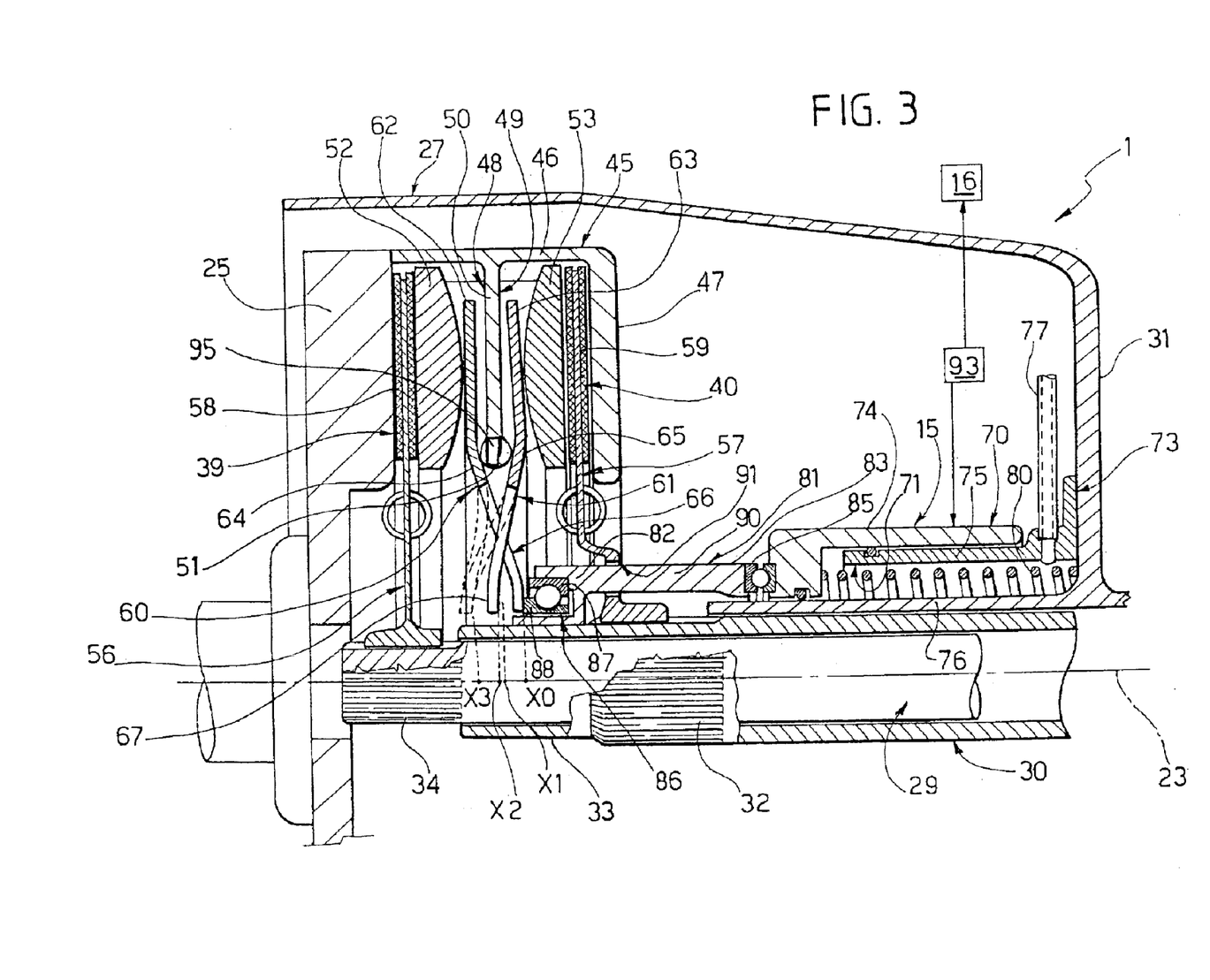
FIG. 3 is a cross-section, on an enlarged scale and with parts removed for clarity, through the dual clutch transmission unit of FIG. 2.

The shafts 9, 10 of the gear change 5 are driven in rotation by the unit 1 which has an axial symmetry with respect to an axis of transmission 23 with the result, therefore, that the part not shown in FIG. 3 is substantially identical and symmetrical with respect to the part shown.

As shown in FIG. 3, the unit 1 is interposed axially between the gear change 5 and a flywheel 25 driven in rotation by the engine 4, is housed in a bell-shaped casing 27 rigid with the gear change 5 and comprises two movement output shafts which are defined by the end sections of the shafts 9 and 10 respectively, bear the reference numerals 29 and 30 respectively, and extend through a base wall 31 of the casing 27.

The shaft 30, associated for instance with the even gears, is internally hollow and comprises an externally grooved intermediate section 32 and an end section 33 bounded externally by a cylindrical surface, while the shaft 29, associated for instance with the odd gears, extends through the shaft 30 and comprises an externally grooved end section 34 disposed in an axial position adjacent to the flywheel 25 and the exterior of the shaft 30.

The sections 34, 32 are driven in rotation by respective clutch devices 39, 40 which have in common a bell-shaped body 45 rigidly connected to the flywheel 25 in a manner which is not illustrated and comprising, in turn, a cylindrical lateral wall 46 extending in a projecting manner from the flywheel 25 and a base wall 47 rigid with the wall 46 and extending radially in a projecting manner from the wall 46 towards the shaft 30 in a position axially spaced from the flywheel 25. The body 45 and the flywheel 25 define a space between one another which is divided axially into two housings 48, 49 by a wall 50 which is rigid with the wall 46, extends in a projecting manner from this wall 46 and ends in an annular projection 51 in the direction of the shaft 30.

The clutch devices 39, 40 comprises respective "disk-thrust" rings 52, 53 housed in the housings 48 and 49 respectively and respective clutch disks 56, 57 which are coupled to the sections 34, 32 in an angularly fixed and axially sliding manner and comprise respective friction portions 58, 59 interposed axially between the ring 52 and the flywheel 25 and between the ring 53 and the wall 47 respectively.

The clutch devices 39, 40 further comprise respective cup springs 60, 61, i.e. of the "Belleville" type, which in turn comprise respective outer annular portions 62, 63 housed in the seats 48 and 49 respectively in an intermediate axial position between the wall 50 and the rings 52 and 53 respectively. The springs 60, 61 further comprise respective intermediate annular portions 64, 65 disposed to bear on the projection 51 and respective inner annular portions each formed by a relative plurality of substantially radial blades 66, 67.

The blades 66 alternate with the blades 67 in a peripheral direction as a result of which they intersect axially, in a rest position of the unit 1, with the blades 67 and face the wall 31, while the blades 67 axially face the flywheel 25.

The blades 66 and 67 are actuated by the device 15 which comprises a single-acting oil-hydraulic linear actuator 70 extending along the axis 23 and having an annular chamber 71 defined by a fixed structure 73 disposed about the shaft 30 and by a piston 74. The structure 73 in particular comprises the wall 31, an outer jacket 75 and an inner jacket 76 which extends in a projecting manner and rigidly from the wall 31, radially faces the shaft 30 and projects axially with respect to the jacket 75. The jacket 75 is rigidly connected to the wall 31 and is traversed by a duct 77 which brings the chamber 71 into communication with the plant 14 and is provided with a proportional flow electrovalve 78 (shown diagrammatically in FIG. 1) controlled by the control unit 16 in order axially to displace the piston 74.

The piston 74 slides in a fluid-tight manner on the jackets 75, 76 under the opposing axial thrusts of the springs 60, 61, on the one hand, and the pressure in the chamber 71 and a positioning spring 80 housed in this chamber 71, on the other hand, in order to cause the axial translation of a return sleeve 81 actuating the "Belleville" springs 60, 61.

Again with reference to FIG. 3, the sleeve 81 forms part of the device 15, is aligned axially with the actuator 70 and comprises two opposing end portions 82, 83, the portion 83 being coupled to the piston 74 by means of the axial interposition of a rolling thrust bearing 85, and the portion 82 being supported in an a sliding manner by the section 33 of the shaft 30 and coupled to the blades 66 by means of the axial interposition of a rolling bearing 86 adapted to bear both radial and axial loads directed towards the piston 74. The bearing 86 in particular comprises an outer ring 87 connected in an angularly fixed position to the portion 82 and an inner ring 88 which is free to rotate with respect to the ring 87 and the sleeve 81 and is disposed in axial abutment against the blades 66.

The sleeve 81 further comprises an intermediate portion 90 formed by a plurality of sectors (not shown in detail) which are spaced from one another in the peripheral direction, extend through respective axial slots 91 obtained in the clutch disk 57 and are therefore coupled to this clutch disk 57 in an axially sliding and angularly fixed manner.

In the condition shown in FIG. 3, the actuator 70 is not active, i.e. the oil pressure in the chamber 71 is zero, and the spring 80 is keeping the sleeve 81 in an axial rest position shown by XO, in which the ring 88 of the bearing 86 is disposed in axial abutment on the blades 66, the spring 60 is preloaded so as to keep the clutch device 39 fully engaged and thereby to transmit a maximum engine torque value from the flywheel 25 to the shaft 29, while the spring 61 is axially spaced from the ring 88 and is not loaded so as to leave the clutch device 40 disengaged.

By introducing oil into the chamber 71 under the control of the electrovalve 78, the pressure in this chamber 71 increases and, as a result, the sleeve 81 moves in axial translation towards the flywheel 25 so as to actuate in sequence the springs 60, 61, which are elastically deformed by pivoting about the projection 51.

Figure 4:
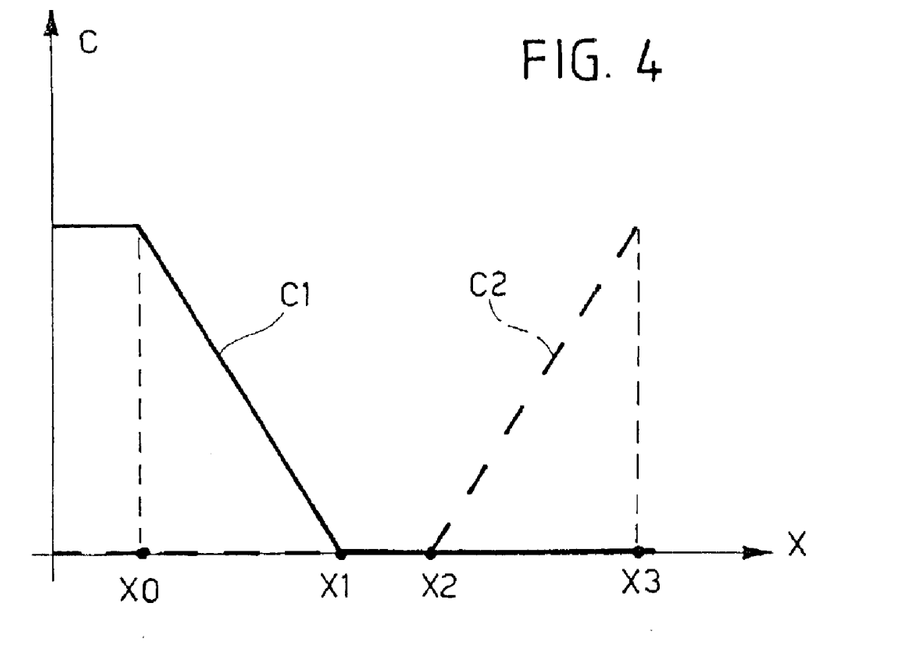
FIGS. 4 and 5 are both graphs showing the operation of the transmission unit of FIG. 3.
Figure 5:
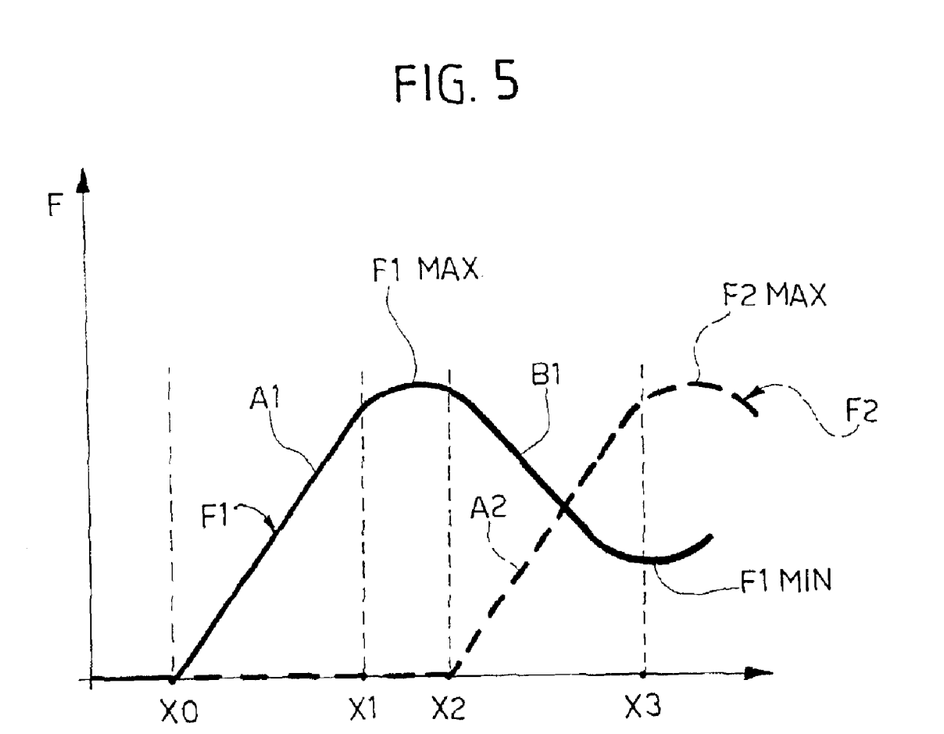

FIGS. 4 and 5 are both graphs showing the operation of the unit 1.

FIG. 4 shows the curves of the engine torque C1 (as a continuous line) and the engine torque C2 (as a dashed line) transmitted by the clutch devices 39 and 40 respectively as a function of the axial stroke "X" of the sleeve 81 or, similarly, of the ring 88 of the bearing 86.

FIG. 5 shows the characteristic curves of the "Belleville" springs 60, 61, i.e. the curves of the axial force F1 (as a continuous line) and the axial force F2 (as a dashed line) required by the actuator 70 to deform the springs 60 and 61 respectively, as a function of the axial stroke X of the sleeve 81 or, similarly, of the ring 88 of the bearing 86.

During a first axial stroke section, the ring 88 progressively pushes the blades 66 in order to reduce the axial load of the spring 60 on the clutch disk 56, as a result of which the engine torque C1 transmitted from the flywheel 25 to the shaft 29 decreases until the ring 88 itself reaches an axial position shown by X1, in which the clutch device 39 is disengaged and the engine torque C1 is zero.

During this first stroke section, the axial force F2 is zero, while the axial force F1 increases progressively along a section of curve A1.

In a second stroke section from the position X1, the clutch devices 39, 40 are disengaged and the engine torques C1 and C2 transmitted to the shafts 29, 30 are zero, until the ring 88 reaches an axial position shown by X2, in which it comes into contact with the blades 67.

Between the positions X1 and X2, the axial force F2 continues obviously to be zero, while the axial force F1 reaches a relative maximum value, shown by F1MAX, at the end of the section of curve A1 and then starts to decrease along a section of curve B1.

From the position X2, the ring 88 travels a third stroke section in which it axially pushes the blades 66 and 67 together, increasing the axial load of the spring 62 on the clutch disk 57 and thereby increasing the engine torque C2 transmitted from the flywheel 25 to the shaft 30. The third stroke section ends when the ring 88 reaches an axial position shown by X3 in which the engine torque C2 reaches a maximum value.

Between the positions X2 and X3, the axial force F1 continues to decrease along the section of curve B1, while the axial force F2 increases progressively along a section of curve A2.

In this way, between the positions X2 and X3, the characteristic curve of the spring 61 increases in a monotonic manner, while the characteristic curve of the spring 60 decreases in a monotonic manner. Therefore, in the stroke section in which the clutch device 39 is disengaged and the clutch device 40 requires an axial force of actuation, the spring 60 has a relatively contained influence on the overall axial force required by the actuator 70 and defined by the sum of the axial forces F1 and F2.

In the hypothesis of the axial stroke of the ring 88 continuing beyond the position X3, the axial force F1 would reach a relative minimum value, shown by F1MIN, at the end of the section of curve B1, while the axial force F2 would reach a relative maximum value, shown by F2MAX, at the end of the section of curve A2. Preferably, the ratio F1MAX/F1MIN is between 1 and 2.5, while the ratio F1MAX/F2MAX is between 1 and 1.8 so that the actuator 70 requires a relatively contained axial force when it actuates the clutch devices 39, 40 between the positions X2 and X3.

In order, however, to cause the displacement of the ring 88 from the position X3 to the position X0, oil is caused to flow from the chamber 71, so as to decrease its pressure, as a result of which the sleeve 81 is displaced in the axial direction opposite that described above under the thrust action of the springs 60, 61. When the driver actuates the lever 13 to change gear, for instance from first to second gear, the control unit 16 receives a relative signal from the lever 13 and therefore controls the device 12 to engage the required gear and, then, the electrovalve 78 in order to reduce the engine torque to the shaft 29 and increase the engine torque to the shaft 30, causing the sleeve 81 and the ring 88 progressively to travel the whole of the axial stroke described above.

The device 15 may possibly be associated with a position sensor 93 (shown diagrammatically in FIGS. 1 and 3) adapted to detect the axial position of the piston 74 with respect to the structure 73 and to supply a relative feedback signal to the control unit 16 which determines the position of the clutch disks 56, 57 and therefore the operating conditions of the unit 1 in order to perform a closed-loop control of the electrovalve 78.

The clutch devices 39,40 are associated with a device 95 (schematically shown) for self-adjusting slack due to wear during use. The device 95 is carried by wall 50 and automatically compensate wear in both the clutch devices 39,40 by axially moving only the pivot point defined by the contact between the projection 51 and the annular portion 64, without operating the clutch device 40. In particular, making the hypothesis of having the same slack in both the clutch devices 39,40, the device 95 is set to axially move the above pivot point of an amount which is double with respect to the slack arised in the clutch device 39.

With reference to FIG. 5, without the device 95, the slack due to wear would cause a shifting of the curve of the axial force F1 towards the left side of the diagram and a shifting of the curve of the axial force F2 towards the right side of the diagram, with a consequent increasing of the operating forces requested to the actuator 70. Thanks to the self-adjustment operated by the device 95, the curve of the axial force F1 is shifted towards the right side of the diagram of an amount which is double with respect to the theoretical amount needed to compensate the wear of the only clutch device 39, in order to "follow" the shifting of the curve of the axial force F2 and to take up also slack of the clutch device 40.

It will be appreciated from the above that the unit 1 is simple, economic and compact, as one of the clutch devices 39, 40 is disengaged and the other is engaged in sequence by a single device 15 controlled by a single electrovalve 78.

The device 15 has a small number of components and is relatively compact as it contains one single-acting actuator 70, which engages/disengages the clutch devices 39, 40 by the axial interposition of a single sleeve 81 and is mounted coaxially with the shaft 30 in order to avoid the use of return transmissions between the piston 74 and the sleeve 81, while the bearings 85, 86 make it possible to unlink the rotary movement of the sleeve 81 from that of the piston 74 and respectively from that of the springs 60, 61.

The unit 1 is very simple in comparison with the known solutions provided with oil-bath clutches, as it uses clutches of the dry type, which are relatively economical and are widely used in the automobile engineering field. The device 15 is extremely compact in the axial direction as well, as a result of the relative arrangement and the particular structural solution of the sleeve 81, the clutch disks 56, 57 and the springs 60, 61 which have the blades 66, 67 interleaved between them.

By using the "Belleville" springs 60, 61 having the characteristic curves described above and illustrated in FIG. 5, it is possible to keep the dimensions and the power required for the actuator 70 and the plant 14 within relatively low limits.

Lastly, the unit 1 makes it possible to keep the vehicle braked when the engine is off on sloping roads without the vehicle 3 having to include further parking ratchet gears and relative control systems for locking the wheels, as the clutch device 39 is completely engaged when the actuator 70 is not active, i.e. is not being controlled.

It will be appreciated from the above that modifications and variations may be made to the unit 1 as described provided that they do not depart from the scope of protection of the present invention.

In particular, the actuator of the device 15 could be different from that described, and could, for instance, be of the pneumatic or electrical type, could be rotary rather than linear, and/or could be disposed in a position other than that described by way of preference.

The shafts 29, 30 could be separate from the shafts 9, 10 and connected to these shafts 9, 10.

The two springs 60, 61 could be configured in a manner other than that illustrated and could, for instance, be substantially parallel and axially spaced from one another, rather than having the blades 66, 67 interleaved, and could be actuated by respective rings borne by the bearing 86 and having different diameters and axial lengths. Furthermore, the axial position X1 could be greater than the axial position X2, in order to avoid lack of torque transmission between X1 and X2, but the configuration shown in FIG. 5 avoids uncertainty in the amount of torque transmitted in a hypothetical intersection point between the curves of the axial forces F1 and F2.

Lastly, a relative device for compensate the wear could be provided for each clutch device 39, 40, instead of the single device 95.

What is claimed is:

1. A dual clutch transmission unit (1) for a motor vehicle (3) provided with an automatic gear change (5) comprising a first and a second ranks of gears, the transmission unit comprising:

a rotary movement input member (45) adapted to be driven in rotation by an engine (4) of the motor vehicle (3), a first (29) and a second (30) movement output shaft adapted to be rigidly connected with respective input shaft (9, 10) of the gear change (5) and associated with the first and the second ranks of gears respectively, a first (39) and a second (40) clutch device adapted to transmit the movement from the rotary member (45) to the first output shaft (29) and the second output shaft (30) respectively, and actuator means (15) for the engagement and disengagement of the first (39) and second (40) clutch devices and comprising a single actuator device (15) for disengaging one and, subsequently, engaging the other clutch device (39, 40), wherein the actuator device (15) acts on the first (39) and second (40) clutch devices so as to maintain the first (39) and second (40) clutch devices in a first condition, in which the first (39) clutch device is engaged and the second (40) clutch device is disengaged, in a second intermediate condition, in which both the first (39) clutch device and the second (40) clutch device are disengaged, or in a third condition, in which the first (39) clutch device is disengaged and the second (40) clutch device is engaged.

2. A transmission unit as claimed in claim 1, wherein the actuator device (15) comprises a single actuator (70).

3. A transmission unit as claimed in claim 2, wherein the actuator device (15) comprises a movement member (81, 86) actuated by the actuator (70) in order to travel a stroke comprising a first section (X0 X1) in which it disengages the first clutch device (39) and a second section (X2, X3) in which it engages the second clutch device (40).

4. A transmission unit as claimed in claim 3, wherein the movement member (81, 86) can move from a rest position, in which the actuator (70) is not active and the first clutch device (39) is fully engaged in order to keep the engine (4) and the first output shaft (29) coupled together.

5. A transmission unit as claimed in claim 4, wherein the actuator (70) is a single-acting fluid actuator.

6. A transmission unit as claimed in claim 5, and comprising a single valve (78) for regulating the flow of fluid from and to the actuator (70).

7. A transmission unit as claimed in claim 3, wherein the first and second output shafts (29, 30) are coaxial with one another along an axis of transmission (23) of the unit (1), the movement member (81, 86) comprising a sleeve (81) coaxial to and coupled in an axially sliding manner to the first and second output shaft (29, 30).

8. A transmission unit as claimed in claim 7, wherein the actuator (70) is coaxial with the sleeve (81).

9. A transmission unit as claimed in claim 8, wherein the actuator (70) and the sleeve (81) are aligned with one another along the axis of transmission (23).

10. A transmission unit as claimed in claim 8, wherein the actuator (70) comprises a fixed structure (73) disposed coaxially about an output shaft (30) and a piston (74) moving axially with respect to this fixed structure (73), a first rolling bearing (85) being interposed between this piston (74) and the sleeve (81) in order to enable a relative rotation therebetween.

11. A transmission unit as claimed in claim 7, wherein the first (39) and the second (40) clutch devices comprise, respective clutch disks (56, 57) coupled to the first (29) and the second (30) output shafts respectively in angularly fixed and axially sliding positions, and respective cup springs (60, 61) actuated by the movement member (81, 86) and cooperating with the clutch disk (56, 57), the sleeve (81) being disposed axially on the same side as the cup springs (60, 61).

12. A transmission unit as claimed in claim 11, wherein the cup springs (60, 61) are interposed axially between the clutch disks (56, 57), the sleeve (81) comprising a plurality of sectors (90) spaced peripherally from one another and extending axially through respective slots (91) obtained in the second clutch disk (57).

13. A transmission unit as claimed in claim 11, wherein the cup springs (60, 61) comprise respective inner annular positions (66, 67) coupled to one another in an axially sliding and angularly fixed manner.

14. A transmission unit as claimed in claim 13, wherein the inner annular portions (66, 67) comprise respective substantially radial blades alternating peripherally with one another.

15. A transmission unit as claimed in claim 13, wherein the movement member (81, 86) comprises a second rolling bearing (86) interposed axially between the sleeve (81) and the inner annular portions (66, 67) to enable a relative rotation therebetween.

16. A transmission unit as claimed in claim 3, and comprising sensor means (93) to determine the position of the movement member (81, 86) along the stroke, and regulation means (16) for the closed-loop control of the actuator (70) as a function of the position detected.

17. A transmission unit as claimed in claim 3, wherein the first (39) and the second (40) clutch devices comprise a first (60) and a second (61) spring respectively, both actuated by the movement member (81, 86) in order to engage/disengage these clutch devices (39, 40), the characteristic axial force/displacement curve of the second spring(F2) comprising, along the second stroke section (X2, X3), an increasing section of curve (A2), while the characteristic axial force/displacement curve of the first spring (F1) comprises a decreasing section of curve (B1).

18. A transmission unit as claimed in claim 17, wherein, along the second stroke section (X2, X3), the characteristic axial force/displacement curve of the second spring (F2) increases in a monotonic manner, while the characteristic axial force/displacement curve of the first spring (F1) decreases in a monotonic manner.

19. A transmission unit as claimed in claim 17, wherein the characteristic axial force/displacement curve of the first spring (F1) has a first branch (A1) increasing to a maximum force value (F1MAX) and a subsequent second branch (B1) decreasing to a minimum force value (F1MIN), the ratio between these maximum and minimum force values (F1MAX/F1MIN) being between 1 and 2.5.

20. A transmission unit as claimed in claim 17, wherein the characteristic axial force/displacement curves of the first and second springs (F1, F2) have respective branches (A1, A2) increasing to a first (F1MAX) and a second (F2MAX) maximum force value respectively, the ratio between the first and the second maximum force value (F1MAX/F2MAX) being between 1 and 1.8.

21. A transmission unit as claimed in claim 1, also comprising means (95) for compensating slack due to wear in said first and second clutch devices (39, 40); said compensating means (95) operating only one (39) of said first and second clutch devices, and being set to compensate an amount of slack which is higher than the slack arised in the operated clutch device (39).

22. A transmission unit as claimed in claim 21, wherein said compensating means (95) are set to compensate an amount of slack which is double with respect to the slack arised in the operated clutch device (39).

23. A transmission unit as claimed in claim 1, wherein the input shafts (9, 10) of the gear change (5) are coupled to an output shaft (6) by respective trains (7, 8) of toothed wheels associated with respective ranks of gears, each rank of gears is controlled by a relative engagement actuator device (11, 12) in accordance with the setting imposed by a driver by means of a lever (13) disposed in a passenger space.

24. A dual clutch transmission unit (1) for a motor vehicle (3) provided with an automatic gear change (5) comprising a first and a second ranks of gears, the transmission unit comprising:

a rotary movement input member (45) adapted to be driven in rotation by an engine (4) of the motor vehicle (3);

a first (29) and a second (30) movement output shaft adapted to be rigidly connected with respective input shafts (9, 10) of the gear change (5), associated with the first and the second ranks of gears respectively, and coaxial with one another along an axis of transmission (23) of the unit (1);

a first (39) and a second (40) clutch device adapted to transmit the movement from the rotary member (45) to the first output shaft (29) and the second output shaft (30) respectively; and actuator means (15) for the engagement and disengagement of the first (39) and second (40) clutch devices and comprising a single actuator device (15) having a single actuator (70) for disengaging one and, subsequently, engaging the other clutch device (39, 40), wherein the actuator device (15) comprises a movement member (81, 86) actuated by the actuator (70) in order to travel a stroke comprising a first section (XO, X1) in which it disengages the first clutch device (39) and a second section (X2, X3) in which it engages the second clutch device (40);

wherein the movement member (81, 86) comprises a sleeve (81) coaxial to and coupled in an axially sliding manner to the first and second output shafts (29, 30);

wherein the first (39) and the second (40) clutch devices comprise respective clutch disks (56, 57) coupled to the first (29) and the second (30) output shafts respectively in angularly fixed and axially sliding positions, and respective cup springs (60, 61) actuated by the movement member (81, 86) and cooperating with the clutch disks (55, 57), the sleeve (81) being disposed axially on the same aide as the cup springs (60, 61).

25. A transmission unit as claimed in claim 24, wherein the cup springs (60, 61) are interposed axially between the clutch disks (56, 57), the sleeve (81) comprising a plurality of sectors (90) spaced peripherally from one another and extending axially through respective slots (91) obtained in the second clutch disk (57).

26. A transmission unit as claimed in claim 24, wherein the cup spring (60, 61) comprise respective inner annular positions (66, 67) coupled to one another in an axially eliding and angularly fixed manner.

27. A transmission unit as claimed in claim 24, wherein the inner annular portions (66, 67) comprise respective substantially radial blades alternating peripherally with one another.

28. A transmission unit as claimed in claim 24, wherein the movement member (81, 86) comprises a second rolling bearing (86) interposed axially between the sleeve (81) and the inner annular portions (66, 67) to enable a relative rotation therebetween.

29. A dual clutch transmission unit (1) for a motor vehicle (3) provided with an automatic gear change (5) comprising a first and a second ranks of gears, the transmission unit comprising:

a rotary movement input member (45) adapted to be driven in rotation by an engine (4) of the motor vehicle (3);

a first (29) and a second (30) movement output shaft adapted to be rigidly connected with respective input shafts (9, 10) of the gear change (5) and associated with the first and the second rank of gears respectively;

a first (39) and a second (40) clutch device adapted to transmit the movement from the rotary member (45) to the first output shaft (29) and the second output shaft (30) respectively;

actuator means (15) for the engagement and disengagement of the first (39) and second (40) clutch devices and comprising a single actuator device (15) having a single actuator (70) for disengaging one and, subsequently, engaging the other clutch device (39, 40), wherein the actuator device (15) comprises a movement member (81, 86) actuated by the actuator (70) in order to travel a stroke comprising a first section (XO, X1) in which it disengages the first clutch device (39) and a second section (X2, X3) in which it engages the second clutch device (40);

sensor means (93) to determine the position of the movement member (81, 86) along the stroke; and regulation means (16) for the control of the actuator (70) as a function of the position detected.

30. A dual clutch transmission unit (1) for a motor vehicle (3) provided with an automatic gear change (5) comprising a first and a second ranks of gears, the transmission unit comprising:

a rotary movement input member (45) adapted to be driven in rotation by an engine (4) of the motor vehicles (3);

a first (29) and a second (30) movement output shaft adapted to be rigidly connected with respective input shafts (9, 10) of the gear change (5) and associated with the first and the second ranks of gears respectively;

a first (39) and a second (40) clutch device adapted to transmit the movement from the rotary member (45) to the first output shaft (29) and the second output shaft (30) respectively; and actuator means (15) for the engagement and disengagement of the first (39) and second (40) clutch devices and comprising a single actuator device (15) having a single actuator (70) for disengaging one and, subsequently, engaging the other clutch device (39, 40), wherein the actuator device (15) comprises a movement member (81, 86) actuated by the actuator (70) in order to travel a stroke comprising a first section (XO, X1) in which it disengages the first clutch device (39) and a second section (X2, X3) in which it engages the second clutch device (40);

wherein the first (39) and the second (40) clutch devices comprises a first (60) and a second (61) spring respectively, both actuated by the movement member (81, 86) in order to engage/disengage these clutch devices (39, 40), the characteristic axial force/displacement curve of the second spring (F2) comprising, along the second stroke section (X2, X3), an increasing section of curve (A2), while the characteristic axial force/displacement curve of the first spring (F1) comprises a decreasing section of curve (B1).

31. A transmission unit as claimed in claim 30, wherein, along the second stroke section (X2, X3), the characteristic axial force/displacement curve of the second spring (F2)

increases in a monotonic manner, while the characteristic axial force/displacement curve of the first spring (F1) decreases in a monotonic manner.

32. A transmission unit as claimed in claim 30, wherein the characteristic axial force/displacement curve of the first spring (F1) has a first branch (A1) increasing to a maximum force value (F1MAX) and a subsequent second branch (B1) decreasing to a minimum force value (F1MIN), the ratio between these maximum and minimum force values (F1MAX/F1MIN) being between 1 and 2.5.

33. A transmission unit as claimed in claim 30, wherein the characteristic axial force/displacement curves of the first and second springs (F1, F2) have respective branches (A1, A2) increasing to a first (F1MAX) and a second (F2MAX) maximum force value respectively, the ratio between the first and the second maximum force value (F1MAX/F2MAX) being between 1 and 1.9.

34. A dual clutch transmission unit (1) for a motor vehicle (3) provided with an automatic gear change (5) comprising a first and a second ranks of gears, the transmission unit comprising:

a rotary movement input member (45) adapted to be driven in rotation by an engine (4) of the motor vehicle (3), a first (29) and a second (30) movement output shaft adapted to be rigidly connected with respective input shafts (9, 10) of the gear change (5) and associated with the first and the second ranks of gears respectively, a first (39) and a second (40) clutch device adapted to transmit the movement from the rotary member (45) to the first output shaft (29) and the second output shaft (30) respectively, actuator means (15) for the engagement and disengagement of the first (39) and second (40) clutch devices and comprising a single actuator device (15) for disengaging one and, subsequently engaging the other clutch device (39, 40), and comprising means (95) for compensating slack due to wear in said first and second clutch devices (39, 40); wherein the compensating means (95) operates only one (39) of said first and second clutch devices, and are met to compensate an amount of slack which is higher than the slack arised in the operated clutch device (39).

35. A transmission unit as claimed in claim 34, wherein said compensating means (95) are set to compensate an amount of slack which is double with respect to the slack arised in the operated clutch device (39).

* * * * *